(12) United States Patent
Chu Ke

(10) Patent No.: US 10,360,835 B2
(45) Date of Patent: Jul. 23, 2019

(54) PIXEL ARRAY

(71) Applicant: Au Optronics Corporation, Hsinchu (TW)

(72) Inventor: Hui Chu Ke, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1042 days.

(21) Appl. No.: 14/523,956

(22) Filed: Oct. 27, 2014

(65) Prior Publication Data

US 2016/0035288 A1    Feb. 4, 2016

(30) Foreign Application Priority Data

Jul. 31, 2014   (TW) .............................. 103126191 A

(51) Int. Cl.
*G09G 3/20*     (2006.01)
*G09G 3/3208*   (2016.01)

(52) U.S. Cl.
CPC ............ *G09G 3/207* (2013.01); *G09G 3/2074* (2013.01); *G09G 3/3208* (2013.01); *G09G 2300/0426* (2013.01); *G09G 2300/0439* (2013.01); *G09G 2300/0443* (2013.01); *G09G 2300/0452* (2013.01); *G09G 2300/0465* (2013.01)

(58) Field of Classification Search
CPC .... G09G 3/207; G09G 3/2074; G09G 3/3208; G09G 2300/0465; G09G 2300/0426; G09G 2300/0443; G09G 2300/0452; G09G 2300/0439
See application file for complete search history.

(56) References Cited

U.S. PATENT DOCUMENTS

| | | | |
|---|---|---|---|
| 6,919,681 B2 | 7/2005 | Cok et al. | |
| 7,050,697 B1 | 5/2006 | Stevenson | |
| 7,714,503 B2 | 5/2010 | Chao et al. | |
| 7,829,887 B2 | 11/2010 | Chang et al. | |
| 2007/0024183 A1 | 2/2007 | Lih et al. | |
| 2008/0252558 A1* | 10/2008 | Kim | G09G 3/2003 345/55 |
| 2009/0121983 A1 | 5/2009 | Sung et al. | |
| 2010/0156279 A1 | 6/2010 | Tamura et al. | |

FOREIGN PATENT DOCUMENTS

| | | |
|---|---|---|
| CN | 103311269 | 9/2013 |
| TW | I233504 | 6/2005 |
| TW | 200600851 | 1/2006 |
| TW | 200603051 | 1/2006 |
| TW | I258721 | 7/2006 |
| TW | 200823520 | 6/2008 |

* cited by examiner

*Primary Examiner* — William Boddie
*Assistant Examiner* — Saifeldin E Elnafia
(74) *Attorney, Agent, or Firm* — JCIPRNET

(57) ABSTRACT

A pixel array includes a plurality of repeating units. Each repeating unit includes three first color sub-pixels, four second color sub-pixels, and three third color sub-pixels. The size of one of the first color sub-pixels is greater than the size of each of the other two first color sub-pixels. The sizes of the four second color sub-pixels are the same. The size of one of the third color sub-pixels is greater than the size of each of the other two third color sub-pixels.

6 Claims, 9 Drawing Sheets

PIXEL ARRAY

CROSS-REFERENCE TO RELATED APPLICATION

This application claims the priority benefit of Taiwan application serial no. 103126191, filed on Jul. 31, 2014. The entirety of the above-mentioned patent application is hereby incorporated by reference herein and made a part of this specification.

BACKGROUND OF THE INVENTION

Field of the Invention

The invention relates to a pixel array, and more particularly, to a pixel array of a display panel.

Description of Related Art

With the vigorous development of display techniques, the demand for display panels to be, for instance, lighter, thinner, high definition, and power-saving has been rising.

To increase the brightness of the display panel and thereby achieve the effect of power-saving, the number of sub-pixels is generally reduced to increase the aperture ratio of pixels.

However, when the number of sub-pixels of the display panel is reduced, the resolution of pixels exhibited by the display panel becomes limited. Therefore, a display panel capable of having good resolution of pixels and aperture ratio of pixels at the same time is urgently needed.

SUMMARY OF THE INVENTION

The invention discloses a pixel array. The pixel array can provide good resolution and brightness to a display panel at the same time.

The invention discloses a pixel array including a plurality of repeating units. Each repeating unit includes three first color sub-pixels, four second color sub-pixels, and three third color sub-pixels. The size of one of the first color sub-pixels is greater than the size of each of the other two first color sub-pixels. The sizes of the four second color sub-pixels are the same. The size of one of the third color sub-pixels is greater than the size of each of the other two third color sub-pixels.

The invention further discloses a pixel array including a plurality of repeating units. Each repeating unit includes three first color sub-pixels, three second color sub-pixels, three third color sub-pixels, and three fourth color sub-pixels. The size of one of the first color sub-pixels is greater than the size of each of the other two first color sub-pixels. The size of one of the second color sub-pixels is greater than the size of each of the other two first color sub-pixels. The size of one of the third color sub-pixels is greater than the size of each of the other two third color sub-pixels. The size of one of the fourth color sub-pixels is greater than the size of each of the other two fourth color sub-pixels.

Based on the above, each repeating unit of the pixel array includes three or four types of color sub-pixels, and each color sub-pixel includes three or four sub-pixels. In particular, for the color sub-pixel having three sub-pixels, the size of one of the sub-pixels is greater than the size of each of the other two sub-pixels. In this way, in the pixel array of the invention, the aperture ratio of pixels can be increased by reducing the number of sub-pixels. Moreover, since the size of each of the other two sub-pixels in the three sub-pixels of the color sub-pixel remains the same, the resolution of pixels can be maintained.

In order to make the aforementioned features and advantages of the disclosure more comprehensible, embodiments accompanied with figures are described in detail below.

BRIEF DESCRIPTION OF THE DRAWINGS

The accompanying drawings are included to help further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
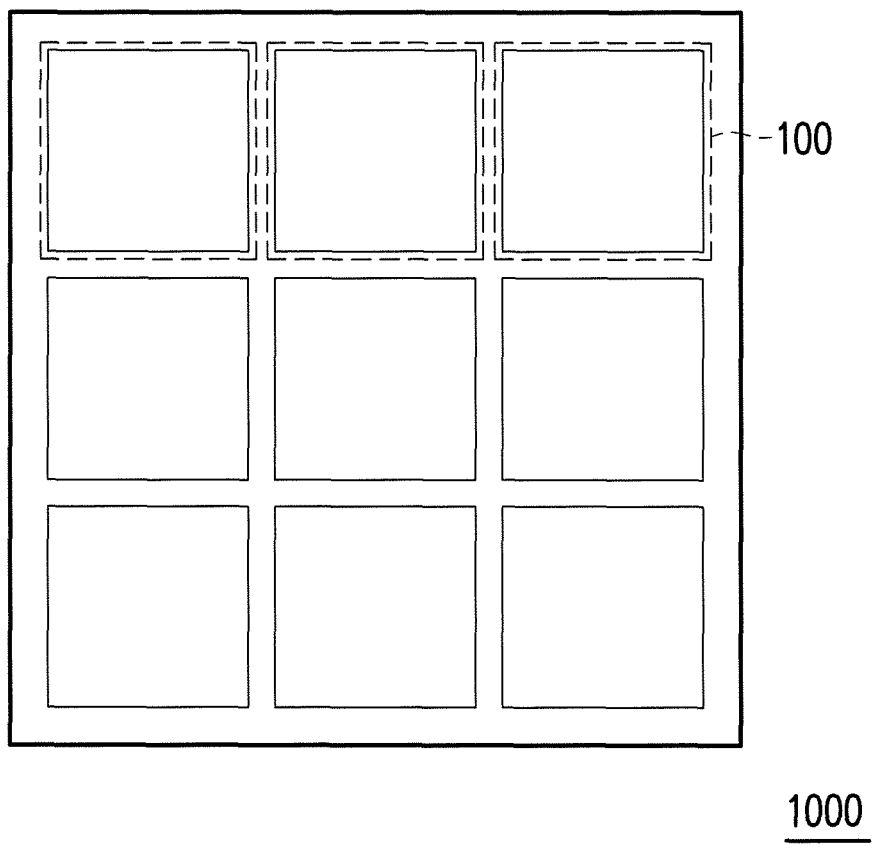
FIG. 1 is a top schematic of a pixel array according to some embodiments of the invention.
Figure 2:
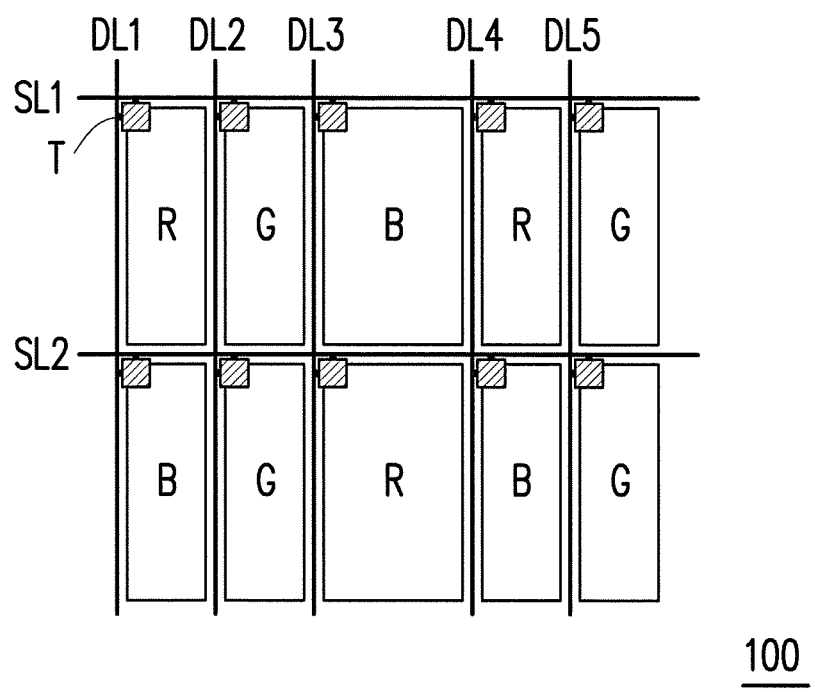
FIG. 2 is a top schematic of a repeating unit of a pixel array according to the first embodiment of the invention.

FIG. 1 is a top schematic of a pixel array according to some embodiments of the invention. FIG. 2 is a top schematic of a repeating unit of a pixel array according to the first embodiment of the invention. Referring to FIG. 1 and FIG. 2, a pixel array 1000 includes a plurality of repeating units 100. For ease of explanation, only one repeating unit 100 is illustrated in FIG. 2. However, those having ordinary skill in the art should understand that, the pixel array 1000 is in actuality an array (as shown in FIG. 1) forming by a plurality of repeating units 100. The repeating unit 100 of the present embodiment includes ten sub-pixels that are respectively three first color sub-pixels R, four second color sub-pixels G, and three third color sub-pixels B. Each of the first color sub-pixels R, the second color sub-pixels G, and the third color sub-pixels B independently includes a scan line, a data line, and a driving element T. In the case that the pixel array 1000 is applied in a liquid crystal display (LCD) panel, the driving element T is, for instance, a thin-film transistor (TFT). However, the invention is not limited thereto. If the pixel array 1000 is applied in an organic electroluminescent display panel (such as an organic light-emitting diode (OLED)), then the driving element T includes, for instance, two TFTs and a capacitor. However, the invention is not limited thereto. The driving element T is electrically connected to the scan line and the data line. As shown in FIG. 2, each repeating unit 100 of the present embodiment includes two scan lines SL1 and SL2 and five data lines DL1 to DL5.

In the present embodiment, three first color sub-pixels R, four second color sub-pixels G, and three third color sub-pixels B are arranged in an array of 2×5. However, the invention is not limited thereto. As shown in FIG. 2, the first row of the repeating unit 100 is, from left to right, the first color sub-pixel R, the second color sub-pixel G, the third color sub-pixel B, the first color sub-pixel R, and the second color sub-pixel G, and the second row of the repeating unit 100 is, from left to right, the third color sub-pixel B, the second color sub-pixel G, the first color sub-pixel R, the third color sub-pixel B, and the second color sub-pixel G. However, the invention is not limited thereto. The sub-pixels of the first row are driven by the scan line SL1, and the sub-pixels of the second row are driven by the scan line SL2. In the present embodiment, the first color sub-pixels R are red sub-pixels, the second color sub-pixels G are green sub-pixels, and the third color sub-pixels B are blue sub-pixels. However, the invention is not limited thereto.

In particular, in the repeating unit 100, the size of one of the first color sub-pixels R (such as the first color sub-pixel R driven by the scan line SL2 and the data line DL3 in FIG. 2, but the invention is not limited thereto) is greater than the size of each of the other two first color sub-pixels R (such as the first color sub-pixel R driven by the scan line SL1 and the data line DL1 in FIG. 2 and the first color sub-pixel R driven by the scan line SL1 and the data line DL4 in FIG. 2, but the invention is not limited thereto). Moreover, the size of one of the third color sub-pixels B (such as the third color sub-pixel B driven by the scan line SL1 and the data line DL3 in FIG. 2, but the invention is not limited thereto) is greater than the size of each of the other two third color sub-pixels B (such as the third color sub-pixel B driven by the scan line SL2 and the data line DL1 in FIG. 2 and the third color sub-pixel B driven by the scan line SL1 and the data line DL4 in FIG. 2, but the invention is not limited thereto). Furthermore, the sizes of the four second color sub-pixels G are the same. In the present embodiment, the size of the one of the first color sub-pixels R (such as the first color sub-pixel R driven by the scan line SL2 and the data line DL3 in FIG. 2) is twice the size of each of the other two first color sub-pixels R. However, the invention is not limited thereto. In the present embodiment, the size of the one of the third color sub-pixels B (such as the third color sub-pixel B driven by the scan line SL1 and the data line DL3 in FIG. 2) is twice the size of each of the other two third color sub-pixels B. However, the invention is not limited thereto. In the present embodiment, the size of the four second color sub-pixels G are the same as the size of each of the other two first color sub-pixels R, and the size of each of the four second color sub-pixels G is the same as the size of each of the other two third color sub-pixels B. However, the invention is not limited thereto.

Figure 3:
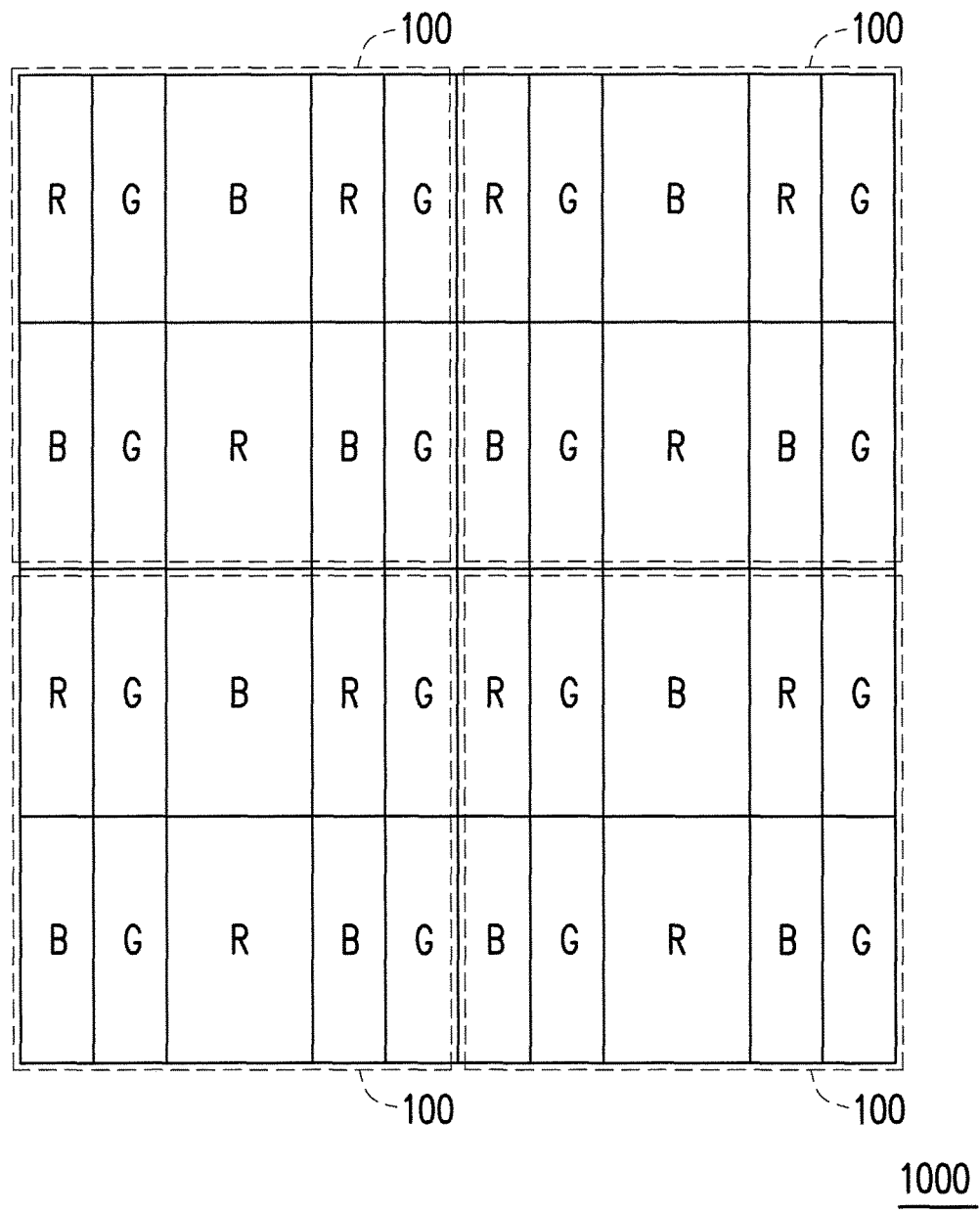
FIG. 3 is a top schematic of a pixel array having a plurality of the repeating unit of FIG. 2.

FIG. 3 is a top schematic of the pixel array 1000 having a plurality of the repeating unit 100 of FIG. 2. For ease of explanation, only four repeating units 100 are illustrated in FIG. 3, and components such as the scan line, the data line, and the driving element of the sub-pixels are omitted. As shown in FIG. 3, the pixel array 1000 is an array formed by the repeating units 100. More specifically, the first row of the pixel array 1000 of the present embodiment is, from left to right, the first color sub-pixel R, the second color sub-pixel G, the third color sub-pixel B, the first color sub-pixel R, the second color sub-pixel G, the first color sub-pixel R, the second color sub-pixel G, the third color sub-pixel B, the first color sub-pixel R, and the second color sub-pixel G. The second row of the pixel array 1000 is, from left to right, the third color sub-pixel B, the second color sub-pixel G, the first color sub-pixel R, the third color sub-pixel B, the second color sub-pixel G, the third color sub-pixel B, the second color sub-pixel G, the first color sub-pixel R, the third color sub-pixel B, and the second color sub-pixel G. The third row and the first row of the pixel array 1000 are exactly the same, and the fourth row and the second row of the pixel array 1000 are exactly the same.

Figure 4:
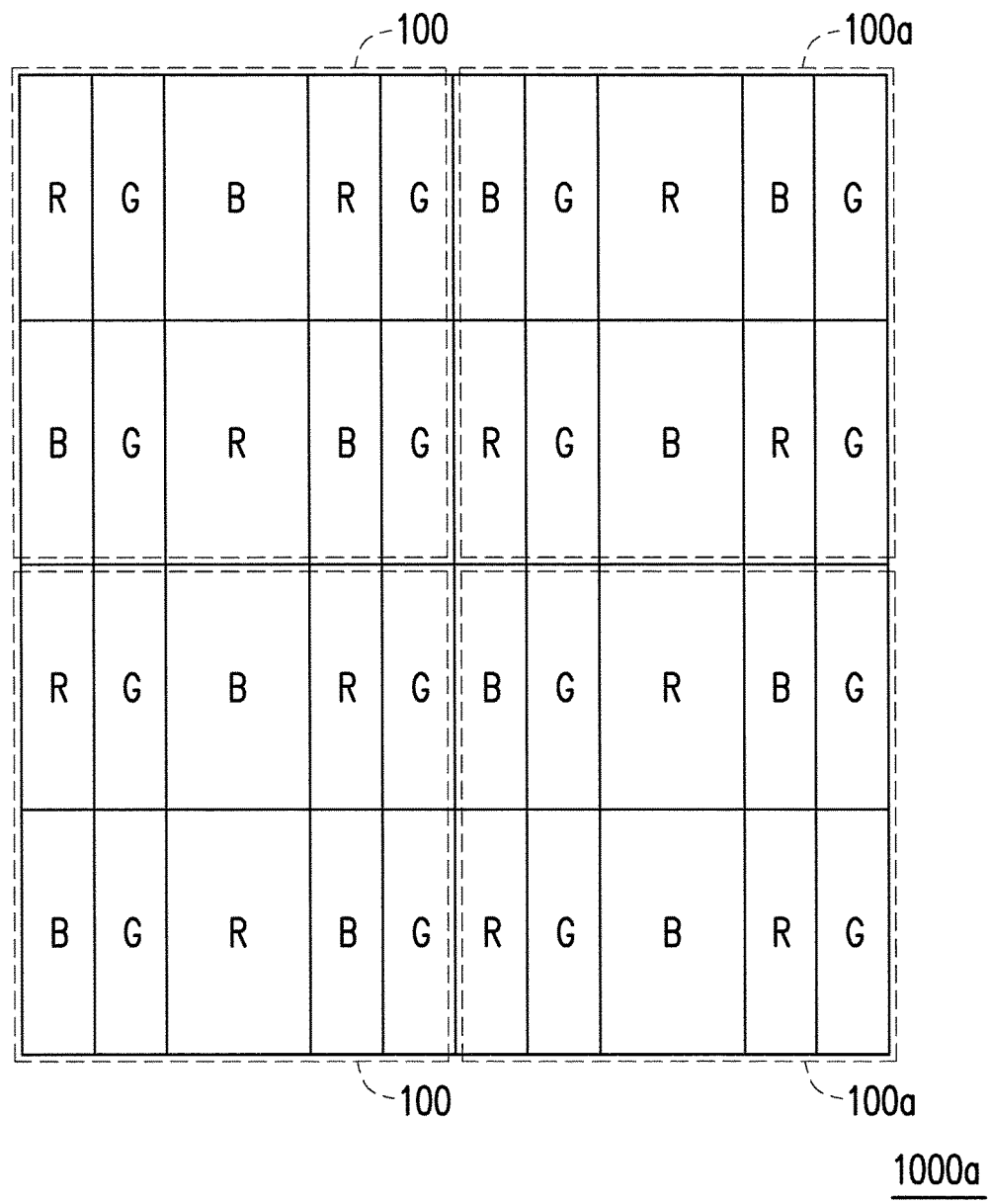
FIG. 4 is a top schematic of another pixel array having a plurality of the repeating unit of FIG. 2.

It should be mentioned that, the invention does not limit that the pixel array can only be formed by the repeating unit 100 of FIG. 2. FIG. 4 is a top schematic of another pixel array 1000a having a plurality of the repeating unit 100 of FIG. 2. As shown in FIG. 4, the pixel array 1000a is an array formed by the repeating units 100 and repeating units 100a. Similarly, for ease of explanation, only four repeating units 100 are illustrated in FIG. 4, and components such as the scan line, the data line, and the driving element of the sub-pixels are omitted. More specifically, the first row of the pixel array 1000a is, from left to right, the first color sub-pixel R, the second color sub-pixel G, the third color sub-pixel B, the first color sub-pixel R, the second color sub-pixel G, the third color sub-pixel B, the second color sub-pixel G, the first color sub-pixel R, the third color sub-pixel B, and the second color sub-pixel G. The second row of the pixel array 1000a is, from left to right, the third color sub-pixel B, the second color sub-pixel G, the first color sub-pixel R, the third color sub-pixel B, the second color sub-pixel G, the first color sub-pixel R, the second color sub-pixel G, the third color sub-pixel B, the first color sub-pixel R, and the second color sub-pixel G. The third row and the first row of the pixel array 1000a are exactly the same, and the fourth row and the second row of the pixel array 1000a are exactly the same. However, the pixel array of the invention is not limited to the pixel array 1000 and the pixel array 1000a of FIG. 3 and FIG. 4.

It should be mentioned that, in the repeating unit 100 and the repeating unit 100a of the present embodiment, the size of each of two of the three first color sub-pixels R (red color sub-pixels) remains the same (that is, resolution of pixels remains the same), and the size of one of the first color sub-pixels R is designed to be twice the size of each of the two first color sub-pixels R (that is, resolution of pixels is reduced). If the resolution of red pixels and the aperture ratio of red pixels of the conventional RGB pixel array are respectively regarded as 1, then the resolution of red pixels resulting from the conventional method of reducing the number of red pixels to increase the aperture ratio of pixels is ½. In particular, the pixel array of the present embodiment can increase the resolution of red pixels to ¾, and can increase the aperture ratio of red pixels by 10% to 20%. In the present embodiment, the size of each of two of three third color sub-pixels B (blue color sub-pixels) remains the same (that is, resolution of pixels remains the same), and the size of one of the third color sub-pixels B is designed to be twice the size of each of the two third color sub-pixels B (that is, resolution of pixels is reduced). Similarly, if the resolution of blue pixels and the aperture ratio of blue pixels of the conventional RGB pixel array are respectively regarded as 1, then the resolution of blue pixels resulting from the conventional method of reducing the number of blue pixels to increase the aperture ratio of pixels is ½. In particular, the pixel array 1000 and the pixel array 1000a of the present embodiment can increase the resolution of blue pixels to ¾, and can increase the aperture ratio of blue pixels by 10% to 20%. Since the human eye is more sensitive to green, in the present embodiment, the size of each of four second color sub-pixels G (green sub-pixels) remains the same, and the resolution of green pixels and the aperture ratio of green pixels can remain the same as the conventional RGB pixel array. In this way, the pixel array 1000 and the pixel array 1000*a* of the present embodiment can make the display panel in which the pixel array 1000 and the pixel array 1000*a* are applied have good resolution and better brightness at the same time.

Figure 5:
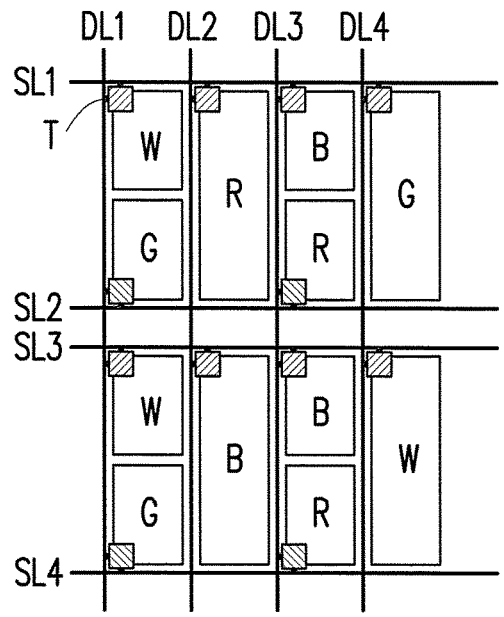
FIG. 5 is a top schematic of a repeating unit of a pixel array according to the second embodiment of the invention.

FIG. 5 is a top schematic of a repeating unit of a pixel array according to the second embodiment of the invention. For ease of explanation, only one repeating unit 200 is illustrated in FIG. 5. However, those having ordinary skill in the art should understand that, a plurality of repeating units 200 can form the pixel array 1000 shown in FIG. 1. The repeating unit 200 of the present embodiment includes twelve sub-pixels that are respectively three first color sub-pixels R, three second color sub-pixels G, three third color sub-pixels B, and three fourth color sub-pixels W. Each of the first color sub-pixels R, the second color sub-pixels G, the third color sub-pixels B, and the fourth color sub-pixels W independently includes a scan line, a data line, and a driving element T. The driving element T is electrically connected to the scan line and the data line. As shown in FIG. 5, a repeating unit 200 of the present embodiment includes four scan lines SL1 to SL4 and four data lines DL1 to DL4, wherein the second scan line SL2 are the third scan line SL3 are disposed adjacent to each other.

In the present embodiment, the first color sub-pixels R are red sub-pixels, the second color sub-pixels G are green sub-pixels, the third color sub-pixels B are blue sub-pixels, and the fourth color sub-pixels W are white sub-pixels. However, the invention is not limited thereto.

In particular, the size of one of the first color sub-pixels R (such as the first color sub-pixel R driven by the scan line SL1 and the data line DL2 in FIG. 5, but the invention is not limited thereto) is greater than the size of each of the other two first color sub-pixels R (such as the first color sub-pixel R driven by the scan line SL2 and the data line DL3 in FIG. 5 and the first color sub-pixel R driven by the scan line SL4 and the data line DL3 in FIG. 5, but the invention is not limited thereto). The size of one of the second color sub-pixels G (such as the second color sub-pixel G driven by the scan line SL1 and the data line DL4 in FIG. 5, but the invention is not limited thereto) is greater than the size of each of the other two second color sub-pixels G (such as the second color sub-pixel G driven by the scan line SL2 and the data line DL1 in FIG. 5 and the second color sub-pixel G driven by the scan line SL4 and the data line DL1 in FIG. 5, but the invention is not limited thereto). The size of one of the third color sub-pixels B (such as the second color sub-pixel B driven by the scan line SL3 and the data line DL2 in FIG. 5, but the invention is not limited thereto) is greater than the size of each of the other two third color sub-pixels B (such as the third color sub-pixel B driven by the scan line SL1 and the data line DL3 in FIG. 5 and the third color sub-pixel B driven by the scan line SL3 and the data line DL2 in FIG. 5, but the invention is not limited thereto). The size of one of the fourth color sub-pixels W (such as the fourth color sub-pixel W driven by the scan line SL3 and the data line DL4 in FIG. 5, but the invention is not limited thereto) is greater than the size of each of the other two fourth color sub-pixels W (such as the fourth color sub-pixel W driven by the scan line SL1 and the data line DL1 in FIG. 5 and the fourth color sub-pixel W driven by the scan line SL3 and the data line DL1 in FIG. 5, but the invention is not limited thereto). In the present embodiment, as shown in FIG. 5, the sizes of the other two first color sub-pixels R, the sizes of the other two second color sub-pixels G, the sizes of the other two third color sub-pixels B, and the sizes of the other two fourth color sub-pixels W are the same. However, the invention is not limited thereto. In the present embodiment, as shown in FIG. 5, the size of each of the one of the first color sub-pixels R, the one of the second color sub-pixels G, the one of the third color sub-pixels B, and the one of the fourth color sub-pixels W is the same. However, the invention is not limited thereto.

In the present embodiment, the size of the one of the first color sub-pixels R (such as the first color sub-pixel R driven by the scan line SL1 and the data line DL2 in FIG. 5) is twice the size of each of the other two first color sub-pixels R, the size of the one of the second color sub-pixels G (such as the second color sub-pixel G driven by the scan line SL1 and the data line DL4 in FIG. 5) is twice the size of each of the other two second color sub-pixels G, the size of the one of the third color sub-pixels B (such as the third color sub-pixel B driven by the scan line SL3 and the data line DL2 in FIG. 5) is twice the size of each of the other two third color sub-pixels B, and the size of the one of the fourth color sub-pixels W (such as the fourth color sub-pixel W driven by the scan line SL3 and the data line DL4 in FIG. 5) is twice the size of each of the other two fourth color sub-pixels W. However, the invention is not limited thereto.

In the present embodiment, the one of the first color sub-pixels R is rectangular, and the other two first color sub-pixels R are square; the one of the second color sub-pixels G is rectangular, and the other two second color sub-pixels G are square; the one of the third color sub-pixels B is rectangular, and the other two third color sub-pixels B are square; and the one of the fourth color sub-pixels W is rectangular, and the other two fourth color sub-pixels W are square. However, the invention does not limit the shape of the sub-pixels to the above.

Figure 6:
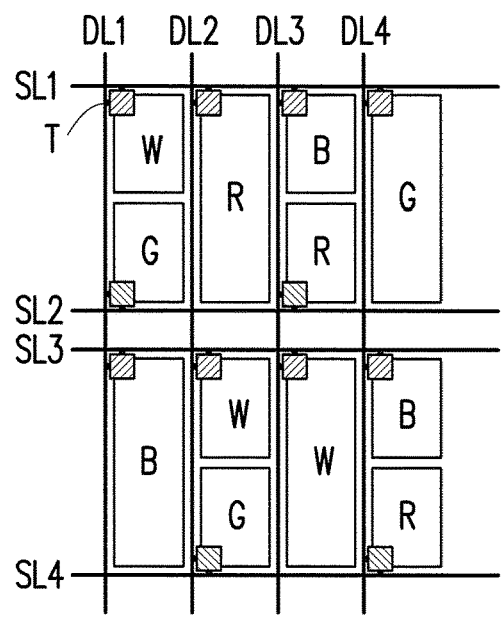
FIG. 6 is a top schematic of another repeating unit of a pixel array according to the second embodiment of the invention.
Figure 7:
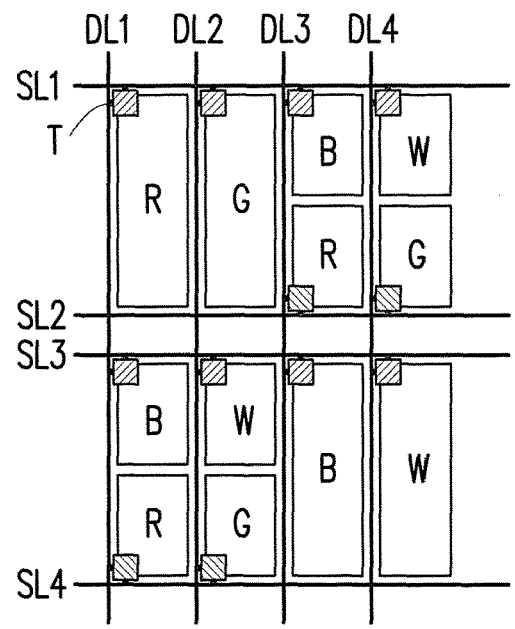
FIG. 7 is a top schematic of yet another repeating unit of a pixel array according to the second embodiment of the invention.
Figure 8:
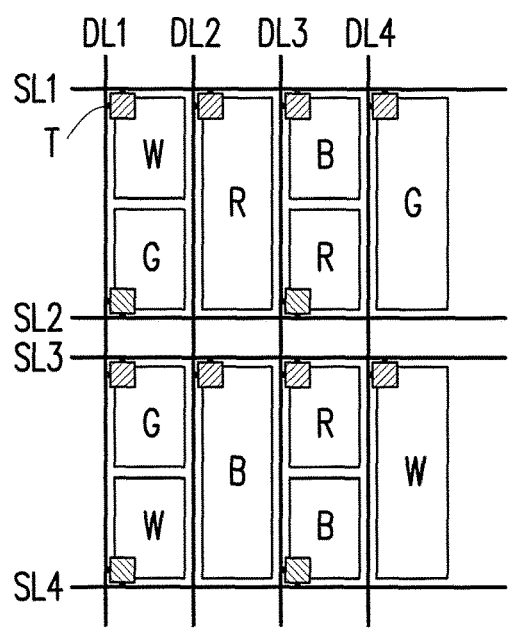
FIG. 8 is a top schematic of still yet another repeating unit of a pixel array according to the second embodiment of the invention.

FIG. 6 is a top schematic of another repeating unit 200*a* of a pixel array according to the second embodiment of the invention. FIG. 7 is a top schematic of yet another repeating unit 200*b* of a pixel array according to the second embodiment of the invention. FIG. 8 is a top schematic of still yet another repeating unit 200*c* of a pixel array according to the second embodiment of the invention. Referring to FIG. 5 to FIG. 8, the repeating units 200*a*, 200*b*, and 200*c* are similar to the repeating unit 200. Therefore, the same or similar elements are represented by the same or similar reference numerals and are not repeated herein. The difference between the repeating units 200 and 200*a*, 200*b*, and 200*c* is only in the order of the first color sub-pixels R, the second color sub-pixels G, the third color sub-pixels B, and the fourth color sub-pixels W. However, in addition to the repeating units 200, 200*a*, 200*b*, and 200*c* of FIG. 5 to FIG. 8, the pixel array of the invention can further include a repeating unit of other arrangements.

It should be mentioned that, in the repeating units 200, 200*a*, 200*b*, and 200*c* of the present embodiment, the size of one of three first color sub-pixels R (red sub-pixels) is designed to be twice the size of each of the other two first color sub-pixels R, the size of one of three third color sub-pixels B (blue sub-pixels) is designed to be twice the size of each of the other two third color sub-pixels B, the size of one of three second color sub-pixels G (green sub-pixels) is designed to be twice the size of each of the other two second color sub-pixels G, and the size of one of three fourth color sub-pixels W (white sub-pixels) is designed to be twice the size of each of the other two fourth color sub-pixels W. If the resolution of pixels and the aperture ratio of pixels of the conventional RGBW pixel array are respectively regarded as 1, then the resolution of pixels resulting from the conventional method of reducing the number of pixels to increase the aperture ratio of pixels is ½. In particular, the pixel array of the invention including any one of the repeating units 200, 200a, 200b, or 200c can increase the resolution of pixels to ¾, and can increase the aperture ratio of pixels by 10% to 20%. In this way, the pixel array of the present embodiment can make the display panel in which the pixel array is applied have good resolution and better brightness at the same time.

Figure 9:
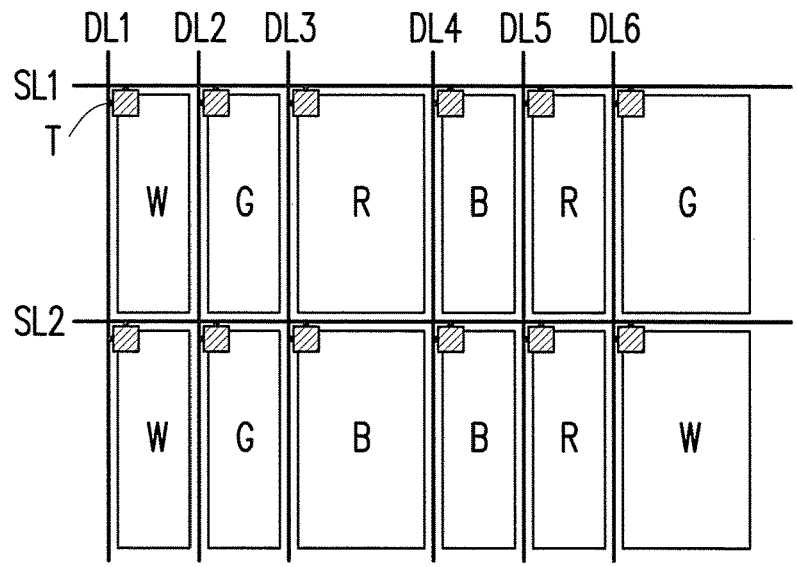
FIG. 9 is a top schematic of a repeating unit of a pixel array according to the third embodiment of the invention.

FIG. 9 is a top schematic of a repeating unit of a pixel array according to the third embodiment of the invention. For ease of explanation, only one repeating unit 300 is illustrated in FIG. 9. However, those having ordinary skill in the art should understand that, a plurality of repeating units 300 can form the pixel array 1000 shown in FIG. 1. The repeating unit 300 of the present embodiment includes twelve sub-pixels that are respectively three first color sub-pixels R, three second color sub-pixels G, three third color sub-pixels B, and three fourth color sub-pixels W. Each of the first color sub-pixels R, the second color sub-pixels G, the third color sub-pixels B, and the fourth color sub-pixels W independently includes a scan line, a data line, and a driving element T. The driving element T is electrically connected to the scan line and the data line. In particular, as shown in FIG. 9, each repeating unit 300 of the present embodiment includes two scan lines SL1 and SL2 and six data lines DL1 to DL6.

In the present embodiment, three first color sub-pixels R, three second color sub-pixels G, three third color sub-pixels B, and three fourth color sub-pixels W are arranged in an array of 2×6. However, the invention is not limited thereto. As shown in FIG. 9, the first row of the repeating unit 300 is, from left to right, the fourth color sub-pixel W, the second color sub-pixel G, the first color sub-pixel R, the third color sub-pixel B, the first color sub-pixel R, and the second color sub-pixel G, and the second row of the repeating unit 300 is, from left to right, the fourth color sub-pixel W, the second color sub-pixel G, the third color sub-pixel B, the third color sub-pixel B, the first color sub-pixel R, and the fourth color sub-pixel W. However, the invention is not limited thereto.

Figure 10:
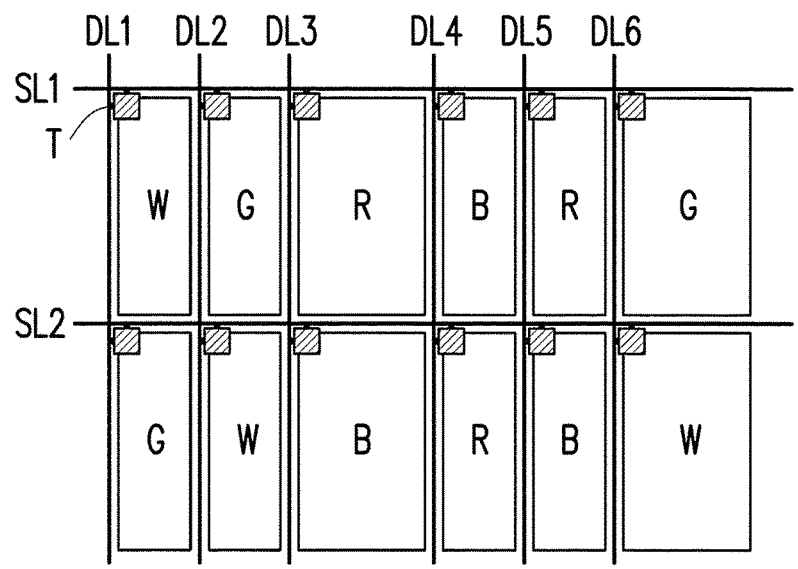
FIG. 10 is a top schematic of another repeating unit of a pixel array according to the third embodiment of the invention.

FIG. 10 is a top schematic of another repeating unit 300a of a pixel array according to the third embodiment of the invention. Referring to FIG. 10, the repeating unit 300a is similar to the repeating unit 300. Therefore, the same or similar elements are represented by the same or similar reference numerals and are not repeated herein. The difference between the repeating unit 300 and the repeating unit 300a is only in the order of the color sub-pixels. As shown in FIG. 10, the first row of the repeating unit 300a is, from left to right, the fourth color sub-pixel W, the second color sub-pixel G, the first color sub-pixel R, the third color sub-pixel B, the first color sub-pixel R, and the second color sub-pixel G, and the second row of the repeating unit 300a is, from left to right, the second color sub-pixel G, the fourth color sub-pixel W, the third color sub-pixel B, the first color sub-pixel R, the third color sub-pixel B, and the fourth color sub-pixel W. However, in addition to the repeating units 300 and 300a of FIG. 9 and FIG. 10, the pixel array of the invention can further include a repeating unit of other arrangements.

Referring to FIG. 9 and FIG. 10, the sub-pixels of the first row of the repeating units 300 and 300a are driven by the scan line SL1, and the sub-pixels of the second row of the repeating units 300 and 300a are driven by the scan line SL2. In the present embodiment, the first color sub-pixels R are red sub-pixels, the second color sub-pixels G are green sub-pixels, the third color sub-pixels B are blue sub-pixels, and the fourth color sub-pixels W are white sub-pixels. However, the invention is not limited thereto.

Similarly, in the repeating units 300 and 300a, the size of one of the first color sub-pixels R (such as the first color sub-pixel R driven by the scan line SL1 and the data line DL3 in FIG. 9) is greater than the size of each of the other two first color sub-pixels R, the size of one of the second color sub-pixels G (such as the second color sub-pixel G driven by the scan line SL1 and the data line DL6 in FIG. 9) is greater than the size of each of the other two second color sub-pixels G, the size of one of the third color sub-pixels B (such as the third color sub-pixel B driven by the scan line SL2 and the data line DL3 in FIG. 9) is greater than the size of each of the other two third color sub-pixels B, and the size of one of the fourth color sub-pixels W (such as the fourth color sub-pixel W driven by the scan line SL2 and the data line DL6 in FIG. 9) is greater than the size of each of the other two fourth color sub-pixels W. As shown in FIG. 9 and FIG. 10, the sizes of the other two first color sub-pixels R, the sizes of the other two second color sub-pixels G, the sizes of the other two third color sub-pixels B, and the sizes of the other two fourth color sub-pixels W are the same. However, the invention is not limited thereto. As shown in FIG. 9 and FIG. 10, the size of the one of the first color sub-pixels R, the size of the one of the second color sub-pixels G, the size of the one of the third color sub-pixels B, and the size of the one of the fourth color sub-pixels W are the same. However, the invention is not limited thereto.

In the present embodiment, the size of the one of the first color sub-pixels R is twice the size of each of the other two first color sub-pixels R, the size of the one of the second color sub-pixels G is twice the size of each of the other two second color sub-pixels G, the size of the one of the third color sub-pixels B is twice the size of each of the other two third color sub-pixels B, and the size of the one of the fourth color sub-pixels W is twice the size of each of the other two fourth color sub-pixels W. However, the invention is not limited thereto.

In particular, in comparison to the repeating units 200, 200a, 200b, and 200c of FIG. 5 to FIG. 8, all of the sub-pixels in the repeating units 300 and 300a of the present embodiment are rectangular. However, the invention does not limit the shape of the sub-pixels to rectangular, and the sub-pixels can be any suitable shape.

Similarly, in the repeating units 300 and 300a of the present embodiment, the size of one of three first color sub-pixels R (red sub-pixels) is designed to be twice the size of each of the other two first color sub-pixels R, the size of one of three third color sub-pixels B (blue sub-pixels) is designed to be twice the size of each of the other two third color sub-pixels B, the size of one of three second color sub-pixels G (green sub-pixels) is designed to be twice the size of each of the other two second color sub-pixels G, and the size of one of three fourth color sub-pixels W (white sub-pixels) is designed to be twice the size of each of the other two fourth color sub-pixels W. If the resolution of pixels and the aperture ratio of pixels of the conventional RGBW pixel array are respectively regarded as 1, then the resolution of pixels resulting from the conventional method of reducing the number of pixels to increase the aperture ratio of pixels is ½. In particular, the pixel array of the invention including the repeating units 300 and 300a can increase the resolution of pixels to ¾, and can increase the aperture ratio of pixels by 10% to 20%. In this way, the pixel array of the present embodiment can make the display panel in which the pixel array is applied have good resolution and better brightness at the same time.

Figure 11:
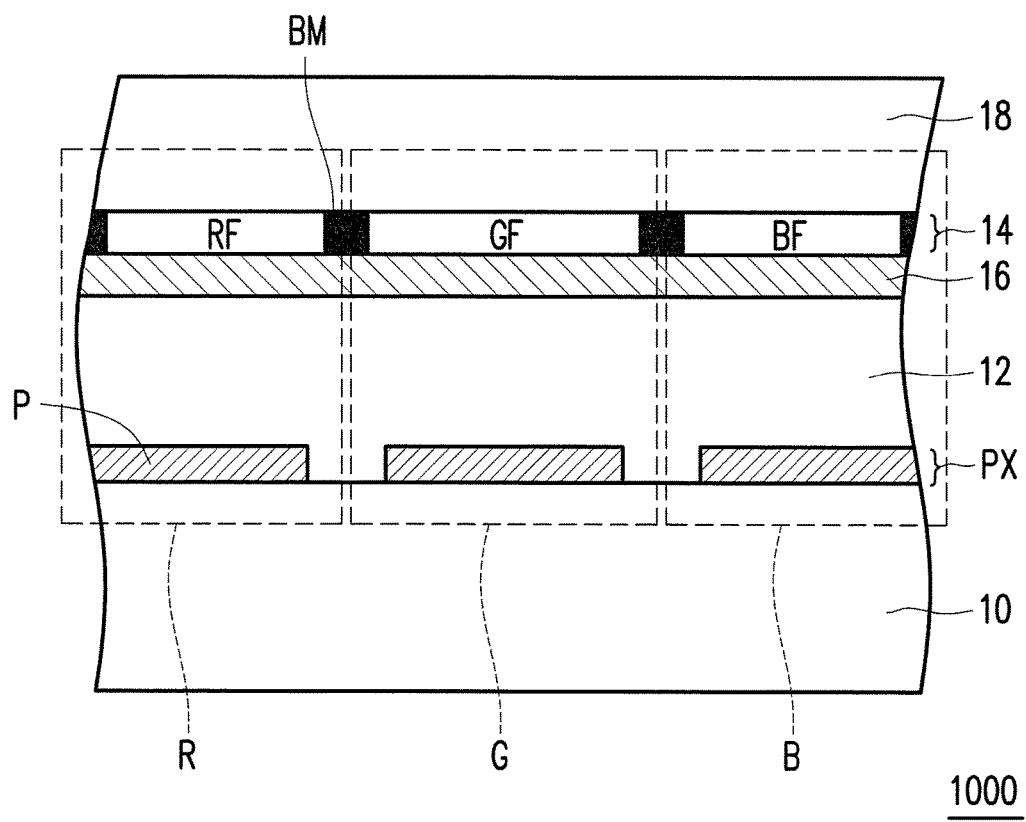
FIG. 11 is a cross-sectional schematic of a pixel array of a display panel according to an embodiment of the invention.

The pixel array according to some embodiments of the invention can be applied in any suitable display panel such as an LCD, an OLED, or an electrophoretic display panel. However, the invention is not limited thereto. FIG. 11 is a cross-sectional schematic of a pixel array of a display panel according to an embodiment of the invention. Referring to FIG. 11, an LCD is used in the present embodiment as example, and the pixel array 1000 of the LCD includes a substrate 10, an opposite substrate 18, an element layer PX, a liquid crystal molecule 12, and a color filter layer 14.

The material of the substrate 10 can be, for instance, glass, quartz, an organic polymer, or an opaque or reflective material (such as metal). The opposite substrate 18 is located in the opposite direction of the substrate 10. The material of the opposite substrate 18 can be, for instance, glass, quartz, or an organic polymer. The liquid crystal molecule 12 is located between the substrate 10 and the opposite substrate 18.

The color filter layer 14 is located on the opposite substrate 18. However, the invention is not limited thereto, and in other embodiments, the color filter layer 14 can also be located on the substrate 10. The color filter layer 14 includes a plurality of first color filter patterns RF, a plurality of second color filter patterns GF, and a plurality of third color filter patterns BF. For ease of explanation, only one of each of the first color filter patterns RF, the second color filter patterns GF, and the third color filter patterns BF are shown in FIG. 11. In the present embodiment, the first color filter patterns RF are red filter patterns, the second color filter patterns GF are green filter patterns, and the third color filter patterns BF are blue filter patterns. However, the invention is not limited thereto. Moreover, a black matrix BM can further be disposed on the opposite substrate 18. The black matrix BM has a plurality of openings, and the first color filter pattern RF, the second color filter pattern GF, and the third color filter pattern BF are respectively disposed in the openings.

In the present embodiment, an electrode layer 16 can further be disposed on the opposite substrate 18. The electrode layer 16 is a transparent conductive layer, and the material thereof includes a metal oxide such as indium tin oxide or indium zinc oxide. The electrode layer 16 is located between the color filter layer 14 and the liquid crystal molecule 12. In the present embodiment, the electrode layer 16 comprehensively covers the color filter layer 14. However, the invention is not limited thereto. An electric field can be generated between the electrode layer 16 and the element layer PX so as to control or drive the liquid crystal molecule 12.

The element layer PX is disposed on the substrate 10. In the present embodiment, the element layer PX is formed by a plurality of pixel structures P. Each pixel structure P includes components (not shown) such as a scan line, a data line, a driving element, a pixel electrode, and a protective layer. As shown in FIG. 11, the pixel array 1000 can include a plurality of the first color sub-pixels R, the second color sub-pixels G, and the third color sub-pixels B according to the above embodiments of the invention. For ease of explanation, only one of each of the first color sub-pixels R, the second color sub-pixels G, and the third color sub-pixels B are shown in FIG. 11. The first color sub-pixel R includes the pixel structure P and the first color filter pattern RF disposed corresponding to the pixel structure P, the second color sub-pixel G includes the pixel structure P and the second color filter pattern GF disposed corresponding to the pixel structure P, and the third color sub-pixel B includes the pixel structure P and the third color filter pattern BF disposed corresponding to the pixel structure P. In the present embodiment, the first color sub-pixels R are red sub-pixels, the second color sub-pixels G are green sub-pixels, and the third color sub-pixels B are blue sub-pixels. However, the invention is not limited thereto. The plurality of first color sub-pixels R, the plurality of second color sub-pixels G, and the plurality of third color sub-pixels B can form any one of the repeating units 100, 100*a*, 200, 200*a*, 200*b*, 200*c*, 300, and 300*a* of the pixel array of the invention.

Figure 12:
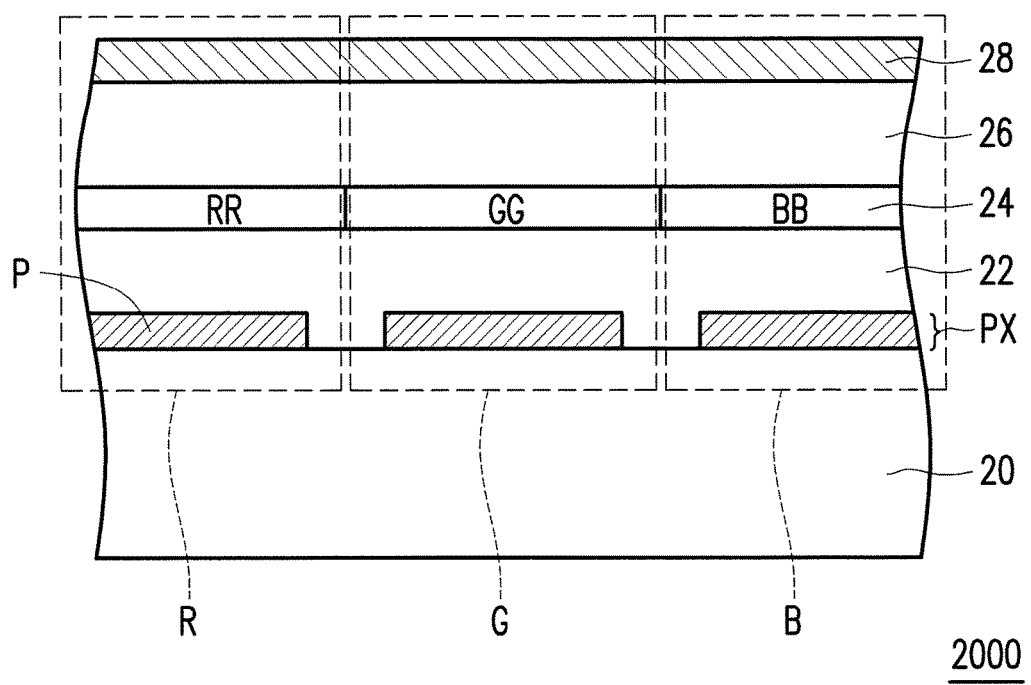
FIG. 12 is a cross-sectional schematic of a pixel array of a display panel according to another embodiment of the invention.

As described above, the pixel array of the above embodiments can also be applied in an OLED. FIG. 12 is a cross-sectional schematic of a pixel array of a display panel according to another embodiment of the invention. Referring to FIG. 12, a pixel array 2000 of the OLED includes a substrate 20, a first organic material layer 22, an organic light-emitting layer 24, a second organic material layer 26, and an electrode layer 28.

A transparent material or an opaque material can be used for the substrate 20, and the substrate 20 can be, for instance, a rigid substrate such as a glass substrate, or a flexible substrate such as a plastic substrate. The element layer PX is disposed on the substrate 20. In the OLED of the present embodiment, the element layer PX is formed by a plurality of pixel structures P. Each pixel structure P includes components (not shown) such as a scan line, a data line, a driving element, a pixel electrode, and a protective layer.

The first organic material layer 22 above the element layer PX can further include at least one of a hole injection layer (HIL) and a hole transport layer (HTL). The forming method of each of the HIL and the HTL includes, for instance, evaporation. However, the invention is not limited thereto.

The organic light-emitting layer 24 is disposed on the first organic material layer 22. The organic light-emitting layer 24 can include a first color light-emitting material RR, a second color light-emitting material GG, and a third color light-emitting material BB. In the present embodiment, the first color light-emitting material RR is a red light-emitting material, the second color light-emitting material GG is a green light-emitting material, and the third color light-emitting material BB is a blue light-emitting material. However, the invention is not limited thereto.

As shown in FIG. 12, the pixel array 2000 can include a plurality of the first color sub-pixel R, the second color sub-pixel G, and the third color sub-pixel B in any embodiment above. For ease of explanation, only one of each of the first color sub-pixels R, the second color sub-pixels G, and the third color sub-pixels B are shown in FIG. 12. The first color sub-pixel R includes the pixel structure P and the first color light-emitting material RR disposed corresponding to the pixel structure P, the second color sub-pixel G includes the pixel structure P and the second color light-emitting material GG disposed corresponding to the pixel structure P, and the third color sub-pixel B includes the pixel structure P and the third color light-emitting material BB disposed corresponding to the pixel structure P. In the present embodiment, the first color sub-pixels R are red sub-pixels, the second color sub-pixels G are green sub-pixels, and the third color sub-pixels B are blue sub-pixels. However, the invention is not limited thereto.

The second organic material layer 26 is located on the organic light-emitting layer 24. The second organic material layer 26 can include at least one of an electron transport layer (ETL) and an electron injection layer (EIL). The forming method of each of the ETL and the EIL includes, for instance, evaporation. However, the invention is not limited thereto.

The electrode layer 28 is located on the second organic material layer 26. The material of the electrode layer 28 includes a transparent metal oxide conductive material such as, for instance, indium tin oxide, indium zinc oxide, aluminum tin oxide, aluminum zinc oxide, indium germanium zinc oxide, other suitable oxides, or a stacked layer of at least two of the oxides. However, the invention is not limited thereto. Moreover, if needed, a component such as a polarizer or a cover plate can be formed on the electrode layer 28. However, the invention is not limited thereto.

Based on the above, each repeating unit of the pixel array of the invention includes three or four types of color sub-pixels, and each color sub-pixel includes three or four sub-pixels. In particular, for the color sub-pixel having three sub-pixels, the size of one of the sub-pixels is greater than the size of each of the other two sub-pixels. In this way, in the pixel array of the invention, the aperture ratio of pixels can be increased by reducing the number of sub-pixels. Moreover, since the size of each of the other two sub-pixels in the three sub-pixels of the color sub-pixel remains the same, the resolution of the pixels can be maintained.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A pixel array, comprising a plurality of repeating units, wherein each repeating unit comprises:
   three first color sub-pixels, wherein a size of one of the first color sub-pixels is greater than a size of each of the other two first color sub-pixels;
   four second color sub-pixels, wherein sizes of each of the four second color sub-pixels are the same;
   three third color sub-pixels, wherein a size of one of the third color sub-pixels is greater than a size of each of the other two third color sub-pixels; and
   two scan lines and five data lines, wherein the first color sub-pixels, the second color sub-pixels, and the third color sub-pixels are arranged in an array of 2×5.

2. The pixel array of claim 1, wherein the size of the one of the first color sub-pixels is twice the size of each of the other two first color sub-pixels.

3. The pixel array of claim 1, wherein the size of the one of the third color sub-pixels is twice the size of each of the other two third color sub-pixels.

4. The pixel array of claim 1, wherein the size of each of the four second color sub-pixels is the same as the size of each of the other two first color sub-pixels, and the size of each of the four second color sub-pixels is the same as the size of each of the other two third color sub-pixels.

5. The pixel array of claim 1, wherein each of the first color sub-pixels, the second color sub-pixels, and the third color sub-pixels comprises:
   one of the two scan lines and one of the five data lines; and
   a driving element electrically connected to the one of the two scan lines and the one of the five data lines.

6. The pixel array of claim 1, wherein the first color sub-pixels are red sub-pixels, the second color sub-pixels are green sub-pixels, and the third color sub-pixels are blue sub-pixels.

* * * * *